Nov. 28, 1939.  B. BURNER  2,181,118
AUTOMATIC INFINITELY VARIABLE TRANSMISSION
Filed Oct. 25, 1934  4 Sheets-Sheet 1

Inventor:
B. Burner.
By H. S. Woodward,
Attorney

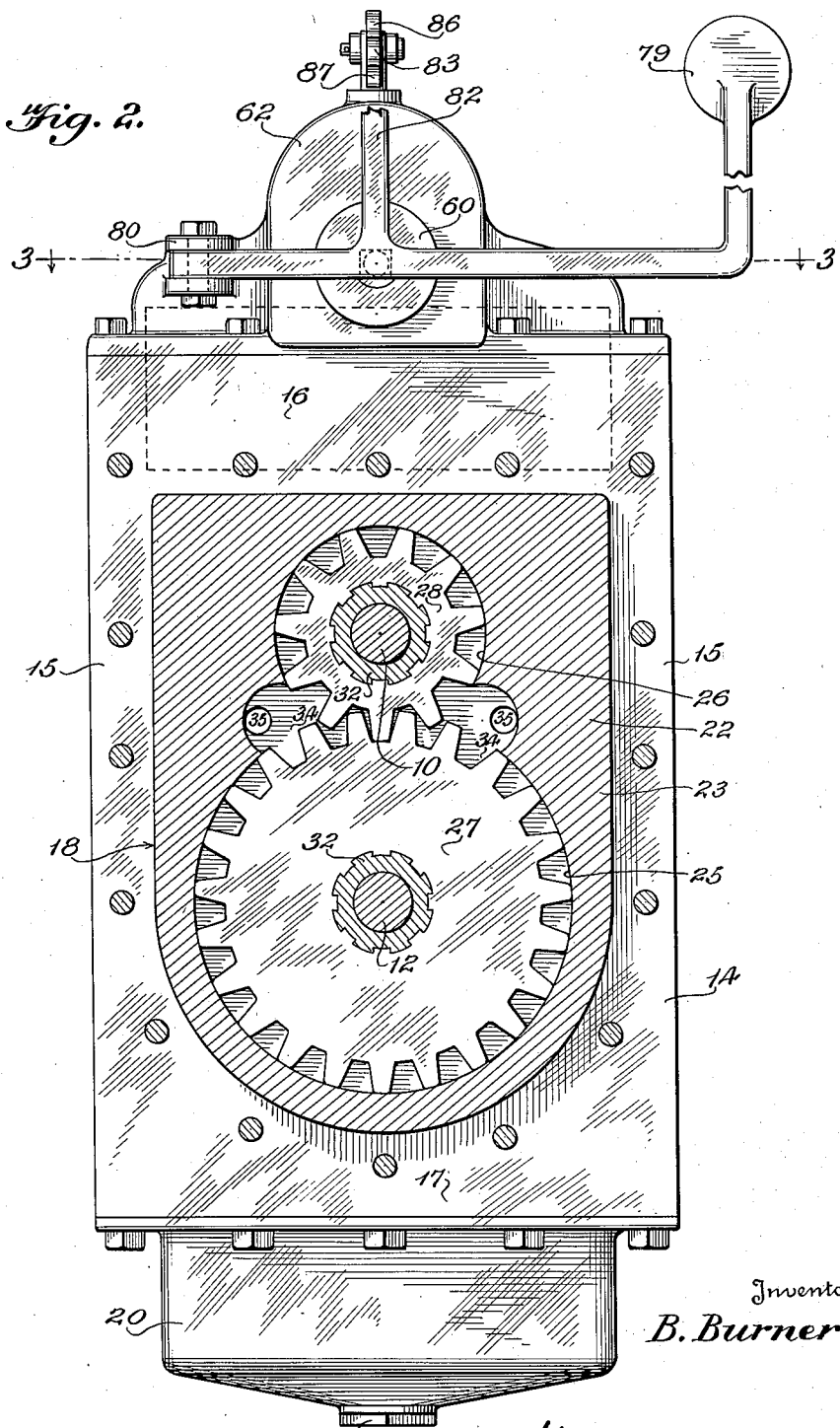

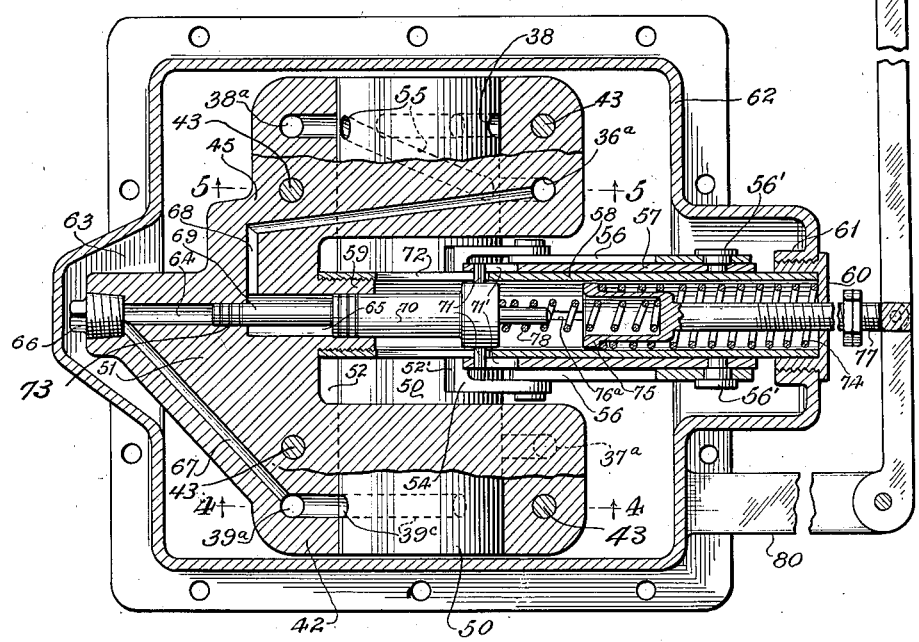

Inventor:
B. Burner.
By H. S. Woodward,
Attorney

Patented Nov. 28, 1939

2,181,118

UNITED STATES PATENT OFFICE 2,181,118

AUTOMATIC INFINITELY VARIABLE TRANSMISSION

Bingham Burner, Annapolis, Md.

Application October 25, 1934, Serial No. 750,005

30 Claims. (Cl. 74—293)

The invention relates to motion converting devices and particularly power transmissions in which the motion of a prime mover element is to be converted into motion of different rate mechanically. In its particular embodiment it is particularly adapted to use in transmission of power from internal combustion engines to motor vehicles, but may be used in various situations, and adapted to use with widely various power plants. It utilizes the idea of the "hydraulic clutch" and the speed varying capacity of the latter, with the positive effect and value of a gear transmission, and has for a particular object to enable a variable ratio transmission of power with the smooth and finely gradual variation peculiarly inherent in the liquid clutch, at the same time that for both starting and normal driving a positive gear train drive is provided whereby liability of excessive heating of the transmission liquid is obviated, and friction in the oil itself minimized, and at the same time liability of failures due to air trapping or depletion of the liquid obviated. It is also an object to present a construction in which simultaneous action of a low and a high gear transmission may be availed of, gradually varied to either extreme from inert or stationary relation to maximum high speed relation, and by producing an infinitely variable blending of the two positive ratios to secure a wide range of intermediate ratios, at the same time that the ordinary hydraulic clutch function of slippage to effect low speed in the driven element is available. This also is distinct from the ordinary hydraulic clutch slippage action in the fact that the principal driving stress is transmitted positively through a gear train and not by the liquid, and also is distinct in that during a very gradual ratio variation in the speeds of the driven and driving element of the device, the power is so transmitted through the gears.

A further object of the invention is to embody a novel and extremely simple control for the transmission.

An important aim of the invention is to embody a means whereby operation of a pedal (which may be also a throttle pedal if desired) will cause automatic variation of the transmission ratio in my device from inert stage to maximum high ratio stage normally. It is also an important attainment of the invention that under normal operation with the pedal or other control set to supply a given amount of power to the driving member, when the load increases, the gear ratio will be automatically lowered so that greater force will be applied to the driven member of the transmission, and upon decrease of the load the ratio will be again and automatically increased to the proper maximum.

A further object is to present a novel construction in the load-responsive mechanism for varying the ratio in transmission of motion between the driven and driving element of the transmission.

A still further object is to present a novel construction in a valve and circulating system for transmission fluid whereby it may be utilized in a hydraulic clutch function, and also utilized to lubricate gears and circulate so as to be cooled.

A further aim is to present a novel construction of framing and housing for the transmission, to the end of simplifying its manufacture and assembly, its servicing and repair.

It is also an important aim to provide in such a device a simple control for securing forward drive and reverse, and to place it in neutral or inoperative condition.

A novel attainment of the invention is the construction and function whereby the reversal of the transmitted motion is secured.

A novel attainment lies in the utilization of two sets of gears operating as high and low ratio transmission gearing and low and high pressure pumps respectively, and the utilization of the pressure from one to the intake of the other to produce a novel result in such transmissions.

It is a valuable attainment of the invention that it obviates the need for or use of any action corresponding to release of a clutch in effecting the variation of the ratio of speed between the driven and driving members of a gear transmission, maintaining a sustained driving torque throughout the variation of the ratio under normal forward transmission.

It is also an important advantage that all gears are maintained constantly in mesh throughout all changes of ratio and direction of transmission.

Another important attainment of the invention is the embodiment of means whereby the sustained automatic and gradual variation of the ratio may extend throughout a variation from the low gear drive to an overdrive, requiring no attention normally from an operator to cause its proper adaptation to the duty required.

There is a further object attained by the invention, residing in a function whereby, notwithstanding the automatic response of the mechanism to load and grade requirements, it will not vacillate and produce abrupt and unnecessarily frequent and short modifications of the ratio of power transmission. Thus, in case of utilization in a motor vehicle, there will not be changes in response to short undulations in a roadway.

It is also an advantage of the device that safety from damage by emergency or other excessively high hydrostatic pressures is effected by means functioning automatically.

A further important novel feature of the invention consists in the utilization of the two liquid pressure sources to control the speed ratio of the transmission automatically in a novel way to the end that when the low ratio gearing is operative the apparatus will respond properly to the overcoming of inertia of the load by increase of the ratio, and similarly when the high ratio gearing is operative, without interruption and with proper and smooth action there will be sustained response to the need for graduation of the high ratio, as well as proper blending of the two ratios at intermediate stages.

It is also an aim to enable the utilization of the apparatus to positively determine the ratio of transmission independently of the load, when desired.

An important aim of the invention is to enable complete release of the transmission from driving relation to the driven apparatus at will, and to provide an extremely simple means to effect this, as well as to selectively place the transmission in forward, neutral or reverse operation.

It is a further important advantage of the invention that excessive hydrostatic pressures are avoided while securing the advantages of finely graduated ratio variation incident to hydraulic transmission devices.

Another important aim of the invention is to enable the attainment of the complete range of variation, release, and reverse, with a single simple valve.

Additional objects, advantages and features of invention reside in the construction, arrangement and combination of parts involved in the embodiment of the invention as will appear from the following description and accompanying drawings, wherein Figure 1 is a vertical section of a complete transmission and automatic control in a unitary system adapted to be assembled and installed in a motor vehicle of standard present-day construction, the view being in a plane coinciding with the axis of the drive shaft of the motor of the vehicle or its equivalent.

Figure 2 is a view from the right of Figure 1 with the front wall of the case removed.

Figure 3 is a horizontal section on the line 3—3 of Figure 2, looking downward, showing the valve in neutral position.

Figure 4 is a cross section of the valve and valve case, on the line 4—4 of Figure 3.

Figure 5 is a similar view on the line 5—5 of Figure 3.

Fig. 11 is a detail of a modified differential forming part of the invention.

Figure 1:
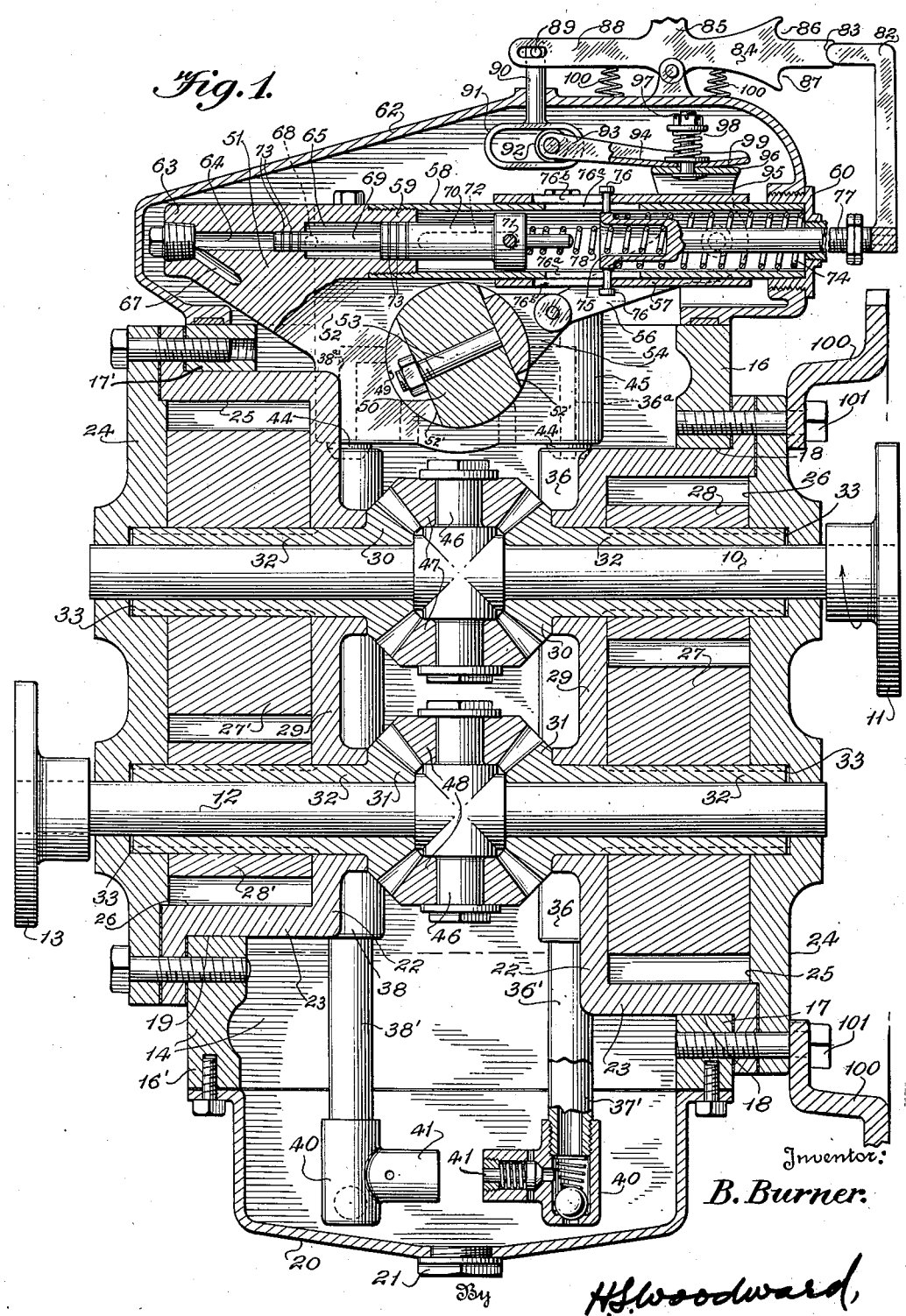
Figure 6:
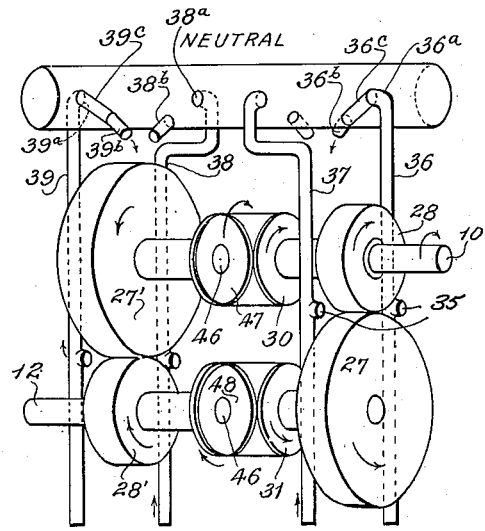
Figure 6 is a diagrammatic view of the system indicating the position of the valve and action of the gearing when the system is in neutral or non-transmission condition.

There is illustrated a unitary and combined transmission and automatic control, so that the control is included in the same housing or casing with the transmission itself, and adapted for installation in conventional motor vehicle chassis. The device includes a driving shaft 10 which may be connected by the usual flanged coupling 11 to the corresponding flange or flywheel of a motor (any other coupling may be used), and a driven shaft 12 parallel to the first and therebelow in this instance and provided with a coupling flange 13 (although any other form may be employed), for connecting this shaft directly to a driving shaft of a motor car or other mechanical or machine element to be operated.

*Construction of gearing*

The unit shown is susceptible of great variation in particular construction while utilizing the invention features involved, so as to adapt it to various vehicles, and to use in other machines, such as presses, paper mills, etc., but in the present instance includes a housing frame 14 rectangular in plan, which consists of two vertical side walls 15, at right and left respectively, and connecting upper and lower wall portions 16 and 17 at the front (in the direction of the motor when connected in a vertical plane at right angles to the wall 15; and similar lower and upper wall portions 16' and 17' at the rear side. The wall 16 is simple in form with a horizontal edge at the bottom defining the upper side of an opening 18 in the front of the housing, the top rectilinear edge of the wall being flush with and in a plane with the rectilinear top edges of the walls 15. The wall 16' is similar except that it is at the bottom of the housing and defines the lower boundary of an opening 19 through the rear of the housing. The wall 17 is in a plane with the wall 16, and has a lower rectilinear edge flush with and in a plane with the rectilinear lower edges of the walls 15. It has an invert semicircular upper edge concentric with the driven shaft 12 defining the lower boundary of the opening through the front of the housing. The wall 17' is in a similar relation to the shaft 10 forming a proper arch over the opening through the rear of the housing. The rear and front faces of the housing around the openings named are smoothly finished, as are the top and bottom faces, which are on the edges of the walls. A removable pressed metal pan 20 suitably flanged is bolted with proper gasket to the lower face of the housing and it forms the bottom closure thereof, being provided with a drain plug 21. It serves as an oil reservoir, auxiliary to the space within the housing. The housing is of sufficient rigidity and strength to properly sustain certain stresses as a gear transmission box, although, as will appear, it is not subject to stresses as severe those involved in ordinary or conventional gear-transmission cases, by reason of the manner of construction and installation of the parts to be subsequently described. Neither is it subject to high hydrostatic pressure.

In the front and rear openings of the housing there are set duplicate gear cases 22, each consisting of a flanged case body 23 shaped to set snugly in the front or rear openings of the housing 14, and a cover plate 24 bolted to the case body and to the housing 14 by bolts engaged through the flange 25 of the case, and through the plate 24, suitable gaskets being interposed on both sides of the flange. Each case body has a large circular chamber 25 and a small one 26 in which are snugly fitted respective meshed "low" gears 27 and 28 in the front case, "high" gears and 27' and 28' at the rear case, fitted snugly between the inner wall 29 of the case body and the cover plate in each instance. However, one case is inverted relative to the other, the small chamber 26 and gear 28 being at the top in the front case, while the larger gear 27' and chamber 25 are at the top in the rear case, concentric with the small chamber at the front.

The shafts 10 and 12 extend concentrically entirely through respective chambers in both these cases as shown, although it is not essential that the extremities opposite the flanges 11 and 13 extend through the plates 24. Revoluble on the shafts, but keyed to the adjacent gears respectively there are upper pinions 30 and lower pinions 31 located within the housing between the cases and each having a long hub 32 extending entirely through the inner wall of the respective case and through the adjacent gear and revoluble in a socket bearing 33 in the cover plate. The gears are thereby supported in the cases. There are inlet or outlet port chambers 34 formed in the cases at respective sides at the junctions of the chambers 25 and 26, and from each of these chambers 34 ports 35 lead through the inner case walls 29 to respective cored ducts 36, 37, 38, 39, formed integrally on the walls 29 of the cases, there being thus two such ducts on each case. These ducts are open at both upper and lower ends on the cases, but have fitted in their lower ends respective pipes 36', 37', 38', 39', with check valves 40 at their lower ends near the bottom of the pan reservoir 20.

These ducts are all preferably enlarged as much as possible, and in the drawings are for convenience shown much smaller than they would be made in practice. They may be broadened so as to be oblong in cross section or may be of any other desired shape. The upper end of each is finished to provide a seat 42 as in Figures 4 and 5, in which there may engage the corresponding tit 44 on a valve case 45, to be subsequently described. The ends of the ducts next the large chamber 25 are divergent with vertical terminations, so that these ends are spaced further apart than the opposite ends of the ducts and they also stop short of the extreme part of the case.

The shafts 10 and 12 are each provided with integral stud arms 46 midway of their length at right angles to the axes of the respective shafts. On the arms of shaft 10 there are revolubly mounted respective differential gears 47 meshed with the pinions 30 at each side and on the studs of the shaft 12 differentials 48 are similarly engaged with the pinions 31. When the shaft 10 is turned, should either pinion 30 be stopped the other, if free, will be turned at twice the speed of the shaft. Likewise turning of one pinion while the other is locked will by engagement with the differential tend to turn the respective shaft in the same direction, at one-half the speed of the operating pinion. If all pinions and shaft 12 are free when shaft 10 is turned, there will be a tendency for all pinions to operate though the advantage will be with the set at the right having the small gear at the top.

The upper differentials 47 may be called the driving differentials, since they normally serve to transmit power by driving the pinions 30 both or either, while the ones 48 may be termed the driven differentials since they normally operate by being driven from one or both of the pinions 31 while travelling on one or the other of them, and so carry with them the shaft 12. At times they may move synchronously, as will appear.

Means is provided to lock the set of gears in either case 22, or to retard movement of one set or both with a gradual variation, so that the effects of both sets of gears may be availed of in various proportions whereby the ratio of transmission may be indefinitely varied from a neutral, zero, or inoperative idling relation where shaft 12 is stationary, to a maximum or full high speed operative relation effected. The same means is also operative to cause at will a reversal of the motion of the shaft 12 from its normal direction, and for other effects as will be explained. This consists in supplying oil to the reservoir 20 which will be pumped by the gears through the ducts, and variably controlling the discharge of this oil.

*The valve*

The ratio changer consists of the valve casing 45 comprising two spaced apart integrally connected end parts having complementary plug valve seats 49 therethrough on a horizontal axis and slightly tapered to receive properly a conical plug valve 50 which extends through the two parts of the case. The casing 45 is formed with four depending tits 44 spaced and arranged to fit simultaneously in the seats 42 at the upper ends of the ducts 36 to 39 of the gear cases, into which they are pressed to a secure seat by a series of bolts 43 engaged thru the valve casing and screwed into the cases 22. On account of the inversion of one case so that its larger chamber is above while the smaller chamber of the other is at the top, one case sets higher than the other. By reason of the wider separation of the ends of the ducts adjacent the larger chambers of the cases, it is possible to shorten these duct ends so that they may set on a level with those ends of ducts on the opposite case which come all the way to the end of the case, and so the lower part of the valve casing may be formed symmetrically and the tits 44 all uniformly disposed at the same level to set in the seats 42 without requiring thinning of the walls of the chamber 25. The two end parts of the casing 45 are spaced so that the high part of the chamber 25 may rise therebetween, and these end parts of the valve casing are joined integrally by an upper rearward body portion 51 above the level of the case 23. Each end part has two tits 44, on opposite sides of the valve 50. In the space at 52 between the two end parts of the valve case, the plug valve is flattened at 52' on opposite sides and drilled centrally of this flattened portion to receive stud bolts 53 by which an operating yoke 54 is secured to the valve, extending forwardly for connection with a control device to be described. From the tits 44 simple port passages 36a, 27a, 38a, and 39a are formed in the valve casing opening on the seats 42 in respective planes transverse to the axis of the valve. In the present instance these port openings are all on a horizontal diametrical plane through the valve and each port is in the same transverse vertical plane with the upper end of its respective duct on the gear case.

Spill ports 36b, 37b, 38b, 39b, are formed at the lower and far sides of the valve casing opposite the ports 36a and 37a, 38a, and 39a respectively, and through the valve there are respective port passages 36c and 39c, the first of which, at what is termed neutral position, connects the ports 36a—36b, and port 39c connects ports 39a and 39b at the same time, as in Figures 4 and 5. There is also included in the valve a port passage 38c, the openings of which are in a plane distinct from that of the planes of openings of the previously described passages in the valve, and adapted to register with ports 38a—38b at the second stage of movement of the valve from neutral position as will be described.

In addition to the passages in the valve above described, there is a reverse passage 55 (Figures 5 and 9) one end of which opens on the face of the valve in the same transverse plane as the port 36a, while the other end opens on the valve in the transverse plane with the port 38a, both openings of this passage 55 being spaced clockwise from the next adjacent ones on the valve so that they will register with respective said ports 36a—38a of the case when the valve is rotated counter-clockwise one unit of movement from the neutral position.

Now it should be noted that the ports of the passages 36c and 39c are broadened in the transverse plane of the valve in which they are located, and that when considered in their neutral position, and as viewed in Figures 4 and 5, the ends of the passage 36c will be extended beyond the ports 36a and 36b counter-clockwise, while the ends of the port 39c extend beyond the ports 39a—39b in a clockwise direction, for purposes to be explained.

The gears 30 and 31 may be made of different sizes for purposes of ratio variation, and the gears 47—48 may be made double gears of appropriate sizes, as in Figure 11, where shaft 12 is shown with double gears 103 on its studs, meshed with a large pinion 104 at the left and a small pinion 105 at the right. By this arrangement the gear 27' may be smaller in proportion to gear 28' and the speed of the latter pinion correspondingly reduced, or other variations made.

Operation of the valve

It will thus be seen that, with the driving shaft 10 connected to the crank shaft of a motor and the driven shaft 12 connected to the common "drive shaft" of a motor vehicle, when the valve is in the neutral position described, the motor is free to turn clockwise as usual, operating both sets of gears as idlers which serve also as pumps taking in oil through the lower parts of ducts 37 and 38, and discharging it through ducts 36 and 39 through ports 36a, and 39a of the valve casing to ports 36c—39c of the valve and spill ports 36b—39b of the casing. In this operation the rotation of the shaft 10 with the studs 46 causes the differentials 47 to travel on the pinion 30 of the large gear 27' rotating the opposite pinion 30 and small gear 28 in the same direction as the shaft 10 and somewhat more than twice as fast. This motion is transmitted to the large gear 27 which consequently rotates half as fast counter-clockwise. The shaft 12 being held stationary, the motion of gear 27 is transmitted through the differentials 48 to the gear 28' driving the latter clockwise the same number of revolutions; this moves the large gear 27' counter-clockwise, and it is this movement of the gear while the differential travels thereon which causes the driving of the gears 28—27 at the proper reduced speed to permit free idling of the mechanism.

It should be noted that the driven shaft 12 rotates for forward transmission or propulsion in a direction opposite that of the conventional drive shaft and this will require a transposition of the usual ring gear or a bottom drive of the ordinary worm gear.

Movement of the valve 50 one unit clockwise as viewed from the left now moves port 39c out of register with 39a, and also moves port 36c, but the latter being broadened at the ends as before described, remains in register with ports 36a—36b for free venting of oil from the left port chamber 34 of gears 27—28. All other ports are closed. This is the "low" position of the valve for extreme positive low ratio forward transmission. Closing of the port 39a locks the gears 27'—28', forcing the differential 47 to travel further on the pinion 30 of gear 27', and propelling the opposite pinion and gear 28 two revolutions clockwise for one of the shaft 10. This motion transmitted to the gear 27 produces therein one turn counter-clockwise for each turn of shaft 10, and the connected pinion 31 propelling the differentials 48 counter-clockwise on the opposite pinion 31 keyed to the locked gear 28' causes the studs and shaft 12 to move one half turn counter-clockwise, or one turn for each two turns of the motor shaft.

By gradually moving the valve from neutral position toward low position application of power to the driven shaft 12 to overcome inertia of the vehicle or its load, whatever that may be, will be gradual, and the ratio of movement of the driven shaft with respect to that of the driving shaft 10 may be built up from zero to the maximum "low" ratio. If desired, port 38c may also be partially opened at the low position, after port 39c is closed. This will permit gradual utilization of the high ratio gears as will be explained.

By movement of the valve 50 clockwise from "low" position one stage further, the port 36c is moved out of register, and closing of the port 36a effected whereby the gears 27—28 are locked. At the same time port 38c is brought into register with ports 38a—38b, affording a vent for oil from the right port chamber 34 of gears 27'—28' and keeping port 38a still closed. Differentials 47 now being forced to travel on the pinion 30 of gear 28, the opposite pinion 30 and its gear 27' are forced to turn clockwise at twice the speed of the shaft 10. This propels the gear 28' four turns counter-clockwise for one turn of shaft 10, causing the lower differentials 48 to travel their orbits twice in the same direction on the stationary right pinion 31, carrying with them the studs of the driven shaft 12 which is thus rotated two turns counter-clockwise for each turn of the shaft 10 or motor. This is the "high" speed position of the valve 50 and also represents the maximum ratio of which the present structure is capable, and in motor vehicles may be equivalent to what is known as an "overdrive"; or one in which the vehicle drive shaft is rotated faster than the motor crank shaft or driving shaft.

It will be apparent, however, that while the valve 50 is in position intermediate of the low and high positions, various degrees of utilization of the low and high gear trains may be effected.

The ends of the port 36c may be widened as in Figure 5, so that it remains in full register with ports 36a—36b until the port 38c is fully open, and the latter is also widened so that it remains in full register while the port 36c is moved to closed position. When both ports 36c and 38c are open, there will be a gradual beginning of movement of the gears 27'—28', and a consequent higher ratio of transmission, if the device is installed in a motor vehicle and the latter is not travelling too steep an ascent. In the latter event, the tendency of the load to reverse the gears 27'—28' is opposed by the closure of ports 39a—39b, and automatically the low gear is caused to function. But by a partial movement of the valve toward closed position of port 36c, movement of the gears 27—28 is gradually checked, and differentials 47 will slowly begin to travel on pinions 30 of gear 28, there then being a partial positive low gear transmission through gears 27—28, and a slight degree of additional motion transmitted through gears 27'—28'. As the valve is moved further this component of transmission through gears 27'—28' will be increased until full high gear transmission is attained, or it may be stopped at any intermediate position to maintain the particular ratio less than full high ratio, and more than the low ratio of gears 27—28.

When the valve 50 is in neutral position, by movement thereof counter-clockwise one stage, the by-pass or reverse port 55 in the valve is brought into register with ports 36a and 38a, while widened port 39c is continued in register with ports 39a—39b. With the parts in this position and relation, the gears 27—28 operate as a pump and the gears 27'—28' also, as in the neutral position. In addition, however, instead of the discharge from gears 27—28 being spilled at 36b, it is directed to the duct 38 which is the intake for gears 27'—28' operating as a pump. The supply of oil from gears 27—28 is greater than that which gears 27'—28' tend to draw, and consequently gears 27'—28' are caused to turn sufficiently to cause rotation of the shaft 12 clockwise one turn for each turn of the shaft 10. This ratio may be reduced by control of the degree of opening of the port 55. It should be noted that the valve face between ports 36c and 55 measures circumferentially less than the port opening 36a so that no complete closure of port 36a occurs, between ports 36c and 55, and a substantial waste of oil through spill port 36b may be effected when desired, permitting rapid operation of the drive shaft 10 to a relatively slow movement of shaft 12. It may also be found desirable to make the gears 27'—28' wider than gears 27—28 affording greater capacity to the gears 27'—28' as a pump, so that by positive feed of the full discharge of gears 27—27 to gears 27'—28' a positive low gear ratio reverse drive of the shaft 12 will be effected. This will also be in accord with the relative stresses on the gears in driving the vehicle.

Figure 10:
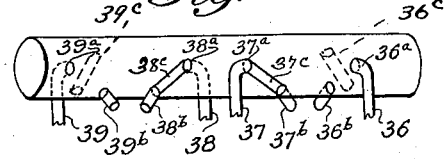
Figure 10 is a view similar to Figure 8 showing an arrangement for "free wheeling".

For normal driving no port connection or spill port 37b is required in association with the duct 37, but (see Fig. 10) if free wheeling or coasting action is desired, a port passage may be provided in the valve at 37c arranged to connect ports 37a—37b by a clockwise movement of the valve to a third stage from neutral, which is one unit or stage from normal high ratio transmission position and the high speed port 38c is then broadened at each end the same as are the ports 36c and 39c and in such direction as to remain in register with the respective ports 38a and 38b while the port 37c is moved to full register position with ports 37a—37b. In this way the device functions for high ratio transmission as long as propulsion is required, but if the throttle of the associated motor is closed and the vehicle tends to move faster than the propulsive effect of the transmission and tends to "over-run" the motor, then the gears 27—28 tend to reverse their movement, while gears 27' and 28' continue and a vent is provided for the oil discharged to the duct 37. Or, if desired, a low pressure vent valve 41 may be provided on the pipe 37' so that the free wheeling action will be automatic. If the auxiliary port 37c is utilized, the valve 41 is made to retain higher pressures, so that a positive driving connection may be maintained at normal high ratio transmission, and over-running of the motor prevented. If desired any familiar means may be utilized to stop the valve at normal "high" position, so that the free wheeling action will be manifest only when desired.

Utilizing the valve 41 for free wheeling, when the valve 50 is set "high" position, if a vehicle in which the transmission is incorporated should proceed down a grade and tend to "over-ride" the motor, there is a tendency to rotate the gears 27'—28' faster than they are being driven by the motor. This develops force tending to reverse the gears 27—28, and operating as a pump, they then take in oil through pipe 36' and develop pressure in duct 37 and its extension 37', which is normally the intake side. The valve 41 of pipe 37' then vents this pressure freely, permitting the car to move forwardly independently of the motor.

*The control*

The operation of the valve 50, as has been indicated, is through a yoke 54, which, when the parts are in neutral position, extends forwardly and upwardly at an angle of about 40 degrees to the horizontal, more or less, and this is on a radius of the valve in line with and on dead center with the operating links 56, pivoted at 56' on the sides of a sleeve 57, longitudinally slidable on a horizontal tube 58 extending forwardly from the upper connecting part 51 of the valve casing 45 and just clear of the valve 50 where it extends between the two end portions of the casing. This tube is interiorly threaded at its rearward end and screwed onto an exteriorly threaded boss 59 formed on the medial part of the casing 45. The front end of the tube is revolubly bushed in an exteriorly threaded screw cap 60, screwed into a nipple 61 of a control casing or cover 62 bolted to the housing 16. The medial part of the valve casing is extended rearward as at 63 to afford a body in which a small or high pressure cylinder 64 is bored, coaxial with the boss 59, and a larger low-pressure cylinder 65, forwardly of, and forming a coaxial continuation of the first, as well as opening through the boss 59. The cylinder 64 is closed at its rear or outer end by a screw plug 66 engaged in a tapped enlargement of the bore, and from the outer end of this bore 64 there extends a duct 67 within the casing 45, opening into the port passage 39a, forming communication therefrom to the cylinder 64.

While the terms "high pressure cylinder" and "low pressure cylinder" have been used in reference to the cylinders 64 and 65, this is done for convenience in distinguishing them, and it may be that the relative pressures may be different, depending as they do on the load to a large extent, as well as the speed of the motor. The pressures from the two sets of gears are communicated to separate cylinders in order that the cylinders may be properly proportioned as experience shows desirable to equalize the effects of the two pressures due to differences in the gear ratios; or tendency to reversal or retard of motion of one set of gears by predominance of pressure from the other; or spillage from retarded gears through open ports of discharge from working gears, unretarded or less retarded.

From the rearward end of the large or low pressure bore 65 a duct 68 is also formed in the valve casing and opening into the port passage 36a. Slidable in the bores 64—65 there is an integral double piston having a reduced piston 69 engaged in the small bore and a large piston 70 engaged in the large bore. The two bores are of equal extent longitudinally. A cross pin 71 is fixed on the front end of the double piston (which is suitably extended and enlarged for the purpose) having ends projecting horizontally through slots 72 in respective sides of the tube 58 and engaging the front ends of these slots to limit forward movement of the pistons to approximately the position shown in Figure 3 where a substantial part of each piston is still engaged in its respective bore. These parts of the piston are circumferentially grooved and may have packing therein if desired, as at 73. The pin 71 is also projected through short slots 71' in the sleeve 57 lying at the rearward parts of these last slots at neutral position of the parts. The piston is normally pressed upon in a rearward direction by spring means (relieved in Figure 1 and also opposed by links 56) including a base spring 74 which should be very heavy, that is to say,—strong, within the front end portion of the tube 58, its front end being seated against the cap 60 while its rearward end bears against the rearward end flange or shoulder 75 of a seat plunger slidable in the tube 58 and having a reduced stem 77 slidably engaged through the cap 60 which is suitably apertured therefor. The rearward end 75 of this seat member is enlarged and recessed to receive the front end of a main spring 78 weaker than the one 74, its rearward end bearing against the piston and being held centered in the tube by a stud on the piston. Opposite pins 76 are projected from the part 75 through long slots 76a in tube 58 and slots 76b in the sleeve 57. These two springs are adapted to be relieved of compression at least partially by operation of the plunger 75 which is moved by means of a foot pedal 79 connected suitably to the outer end of the stem of the plunger, being pivotally mounted on a stud bracket 80 at the right hand side of the control casing 62 and extending beyond the left hand side of the housing 16 a suitable distance. The pedal 79 has an arm 82 extending upwardly and rearwardly to engage in the notched central and forward extremity 83 of a front base arm 84 of a starting or forward and reverse selector hand lever 85, by which means the operator determines only whether the transmission shall be neutral, or operate forwardly or reverse. This arm is arranged to swing up and down in the present instance and in the relation of parts shown the valve is in neutral position, the arm 84 being held by the spring-pressed pedal arm 82 opposing movement of the notch at 83 in either direction. Upper and lower reverse and forward notches 86 and 87 are located some distance rearwardly of the notch 83 on the arm 84 to receive the arm 82 alternatively. The lever 85 also has a base rearward arm 88 having a longitudinally slotted forked extremity in which is engaged the cross pin 89 of a plunger 90 slidably engaged vertically through the top of the casing 62. The lower end of the plunger is formed with a horizontally elongated eye 91 having rectilinear parallel upper and lower sides extending fore and aft and having rollingly engaged therein a wiper roll 92 carried between ears 93 at the rearward extremity of a lever arm by which the links 56 are operated yieldingly to turn the valve a limited extent. For this purpose the links 56 are stamped integrally from sheet metal as two parallel L-shaped bell crank levers pivoted at the angles of the levers on pins 56' fixed on the sleeve 57. The arms connected to the yoke 54 are the links proper, while shorter arms 95 extend upwardly a distance above the sleeve 57 and are bent over and joined integrally above this sleeve. The joining part 96 of the bell cranks is preferably formed as a planiform part, termed a "flat", approximately horizontal when the valve is in neutral position, and having a substantial extent from front to rear. A stud bolt 97 is engaged therethrough, projecting upwardly therefrom and having a spring 98 therearound, confined by a nut on the upper end of the bolt. The arm 94 comprises a comparatively broad plate 99 curved slightly at its forward part to lie as a rocker on the flat part 96 of the bell crank member, its rearward part being cut away centrally and its lateral edge portions turned up to form stiffening flanges and rearwardly projected ears 93. The bolt 97 extends through the plate 99, and the spring 98 bears upon the plate 99 so as to hold the latter yieldingly in operating relation to the flat 96 of the bell cranks and links 56.

*Operation of the control*

Figure 7:
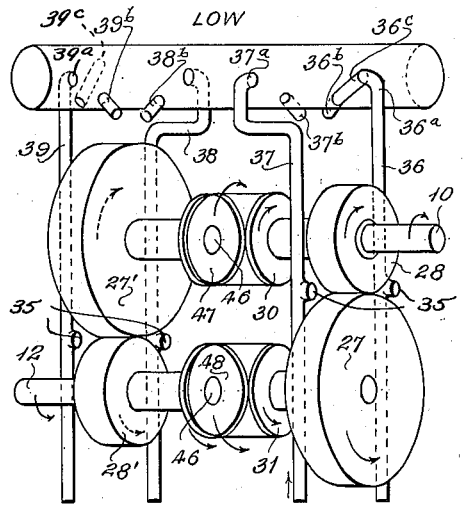
Figure 7 is a similar view showing the system operative for low ratio transmission.
Figure 9:
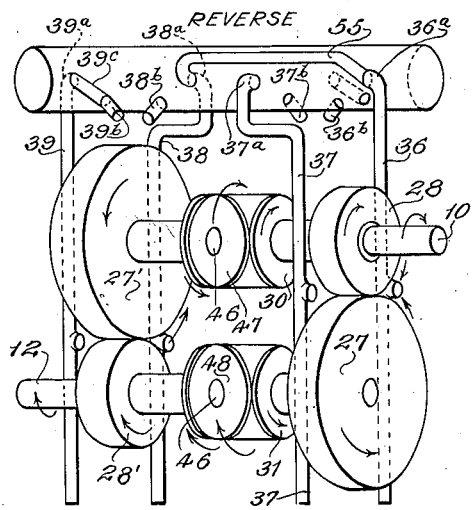
Figure 9 is a similar view showing the system operative for reverse of the driven member.

It will be apparent from the foregoing that rearward movement of the lever 85 will tend to depress the lever arm 94, and likewise tends to cause depression of the links 56 by reason of the clamping of the arm 94 to the flat 96, and if not opposed, this will set the valve at "low" position, as indicated in Figure 7. Likewise, forward movement of the lever 85 from the neutral position of Figure 1, and release of the pedal, will tend to raise the arm 94 and also tends to raise the links 56 and move the valve to "reverse" position as indicated in Figure 9. Various constructions for coaction of the lever 85 with the automatic control may be provided, or other device provided instead of the lever 85, as found desirable, but in the present instance, in order to shift the lever 85 from "reverse" to "neutral" or "low" it is necessary to depress the foot pedal.

Neither of the movements of the valve by the lever 85 can occur, however, as long as the pedal 79 is fully depressed, since this draws the seat plunger forwardly and by its pins 76 engaging the ends of the slot 76b in the sleeve 57 moves the valve positively to neutral position. But when the pedal is released, the spring 74 expands, compressing spring 78 and moving pins 76 rearward in the sleeve 57. The resultant effect of movement of lever 85 in either direction from neutral position is simply to insure the direction of movement of the links 56 from dead center after release of the pedal 79 and action of the valve in response to pressure of the springs 74—78 and oil pressures in the cylinder. The valve can not move to neutral position by action of the piston, because piston movement is stopped by cross pin 71 in slot 72 before the dross pin 71 carries the sleeve 57 to its limit by engagement with the forward ends of the slots 71'.

When the lever 85 is shifted from "neutral" and the pedal is released, should there be low hydrostatic pressure in the system the springs 74—78 will press the piston rearwardly drawing the sleeve 57 and moving the valve toward "high" position against the action of the spring 98 which tends to cause retention of the valve at "low" position. But if the load is excessive it will quickly cause building up of pressure in duct 36a and movement of the piston against the springs 74—78 with consequent movement of the valve toward "low" position and opening of port 36a. Pressure in the passage 39 then is maintained at sufficient high stage to keep the valve in this position until the device may operate for automatic return toward "high" ratio position, as hereinafter described.

It will appear, therefore, that under the present construction in normal operation the only positive movement of the valve is that exceptionally effected by the pedal moving the valve to "low" or "neutral", and a moderate positive movement by pedal and lever 85 to "reverse". It will be noted that in reverse operation the valve can not be moved by action of the pistons or springs 74—78 from the reverse position. It can also be readily understood that the valve may at any time be moved to "low" or "neutral" position while the vehicle is in motion, and whether the motor is operating or not. In the movement toward neutral position, the device serves as a very effective brake, its action being dependent solely on the position of the pedal and not on pedal pressure.

Vehicle use

Figure 8:
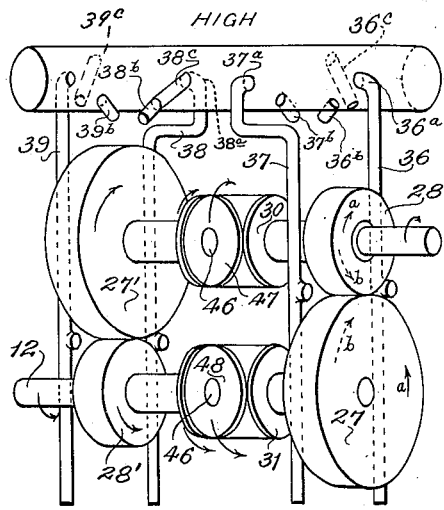
Figure 8 is a similar view showing the system operative for high ratio transmission.

Assuming that the apparatus is in the neutral position shown, being installed in a motor vehicle, and the motor in operation, in order to start the vehicle forward, the pedal 79 is first depressed to release the arm 82 from the notch 83, and the lever 85 then shifted rearwardly. The pedal is then released, permitting the arm 82 to move rearwardly to the notch 87. The tension applied through the arm 94 to the links 56 by the first movement of the lever 85 now throws the links 56 off center downward, and the expanding spring 74 carries the seat member 75 rearwardly clearing the pins 76 from the forward ends of the slots 76b so that the sleeve 57 moves rearward, turning the valve to "low" position. The spring 78 is also compressed so that it tends to move the piston 69—70 rearwardly, the first part of this movement carrying the pin 71 along the slots 71', until the rear ends of these are engaged, or keeping the pin so engaged during the first part of the movement of the sleeve. If there is high oil pressure the sleeve is free to move until the pin 71 engages the front ends of the slots 71' when it is checked with the valve moved only to "low" position, and the sleeve is free to be returned toward "neutral" position by pedal operation, if desired. The pin 71 can not follow such forward movement of the sleeve because of engagement of the pin at the front ends of slots 72, but serves to stop such movement of the sleeve at neutral position if the pedal is operated, by again engaging the rear ends of the slots 71'. In case of low oil pressure being manifest, the first part of movement of the piston by the spring 78 produces no effect, by reason of the lost motion relation of the pin 71 in the slot 71', but the pin then engages in these slots moving the sleeve rearward, carrying the valve toward "high" position, as in Figure 8. With the motor in operation, however, the hydrostatic pressure in duct 36 is quickly built up and communicated through duct 68 to the cylinder 65, moving the piston forwardly again against the actions of the springs and after a short movement of the pistons the pin 71 again engages the front ends of slot 71', moving the sleeve and turning the valve back to "low" position, as in Figure 7. In the latter part of this movement pressure built up by gears 27'—28' in duct 39 is communicated through duct 67 to the cylinder 64, contributing to counter-clockwise movement of the valve until the reduction of the ratio of transmission has enabled the power applied through shaft 12 to overcome the inertia of the vehicle. In this final position, only pressure in duct 39 is effective, through cylinder 64, to maintain the valve in "low" position. When the vehicle starts and its motion has been accelerated to a stage where the motor is operating at a moderate to maximum speed for the throttle opening set by the operator, a fall of pressure occurs in the duct 39 and cylinder 64, and the springs 74—78 then move the piston rearwardly, drawing the sleeve 57 rearward and causing the links 56 to move the valve clockwise so as to bring the port 38c gradually into lap with its respective ports 38a and 38b and begin closure of port 36c, which partially retards gears 27—28 and communicates pressure to cylinder 65, resulting in utilization in part of the higher ratio of gears 27'—28'. This tends to increase pressure momentarily or to sustain it by adding pressure in cylinder 64, but actually a progressive fall occurs as further momentum is developed in the vehicle by operation partially of gears 27'—28' simultaneously with gears 27—28. Normally the vehicle continues to gain headway and pressures continue to fall in the cylinder 64 with a slightly compensating increase in cylinder 65, permitting the springs 74—78 to move the piston forwardly and turning the valve clockwise with utilization of an increasing component of the ratio of gears 27'—28' by increased retardance of gears 27—28 until the latter are finally locked (see Fig. 8) and full overdrive is attained.

If the vehicle is ascending a steep grade, or is heavily loaded, the full overdrive may not be attained and the clockwise movement of the valve as last described may be checked or even reversed as the increased load tends more to resist operation of gears 27'—28' and this reacts on gears 27—28, causing them to tend to rotate with greater force against the retarding liquid in duct 36. This pressure so overbalances the springs that transmission continues with the valve at some intermediate position between low and high positions, utilizing proportionate components of the ratios of the two sets of gears according to the aggregate pressure on the pistons, and the adjustment of the compression of the springs by the cap 68, or other spring adjusting means. This adjustment may be varied to correspond to the load and efficiency of the motor, but generally, with gears correctly designed for the given vehicle and its maximum proper load, and the springs normally adjusted, the operation of the device tends to automatically accommodate itself to various loads and grades. However, as will be explained, the operator may, with the structure described, positively vary the action of the springs 74—78 to compensate for heavy loads by use of the pedal 79, as will be explained. This will serve, by momentary utilization, to enable satisfactory operation of an underpowered outfit by utilizing lower ratios for intermediate starting operations, and on certain grades which would not require so low a ratio for lighter loads, or with a more powerful or more efficient motor.

As the connection with the yoke 54 swings downward the links 56 will thereby be drawn rearwardly bringing the roller 92 rearwardly in the eye 91. The springs 74—78 having pressed the pistons rearwardly until the cross pin 71 is at the rearward ends of the slots 71', it will be maintained at the rearward ends of the slots 71' during the ratio changes incident to normal acceleration of a vehicle.

The adjustment of tension of springs 74 and 78 may be by means of the cap 60 which may be screwed in or out to compress the springs more or less, or other means of greater range may be provided. Nuts 101 may be provided on the stem of the plunger to act as stop means limiting forward movement of the plunger. As the pressure reaches a high sufficient to overcome the resistance of the spring 78 the plunger 75 may be moved backward slightly by depressing the pedal 79 without changing the transmission effect or position of the valve, due to movement of pin 71 in the slot 71'. But this movement will be limited by the slot 72 so that no further movement beyond "low" will be thus effected.

If at any time it should be desired to arbitrarily lower the ratio of transmission, this may be effected by pressure on the foot pedal to any extent desired, which has the same effect as increased hydrostatic pressure, relieving the compression of the springs so that comparatively low pressure may move the piston 70 forwardly turning the valve counter-clockwise. This unlimited use of the pedal is permissible with the construction of Figure 1.

It is also possible to positively move the valve to low gear position by partial depression of pedal, and when the plunger 75 is drawn forwardly to a proper distance, the lever 85 is free to be moved toward neutral position so that if desired, it may be retained there by notch 89. Full forward movement of the pedal will cause the plunger 75 to move the pins 76 to engage the ends of slots 76b and so move the valve to neutral position (which would have the effect of a positive brake or lock of the vehicle wheels).

In regard to the forms of the gears, the teeth may be elements of spirals of high pitch—that is, slightly inclined from elements parallel to the axis of the gear—so that quietness may be assured, and they may be epicycloidal. But it is thought desirable that they vary as little as possible from parallelism with the axis.

It will be appreciated that the hydrostatic pressures developed in this transmission will be proportional to the torque transmitted or communicated to the driven member of the transmission, and that therefore the action of the pistons 69 and 70 and valve, may be said to be responsive to the load carried by the transmission. The force necessary to move the vehicle or other mechanism operated from the driven member of this transmission may be said to be the load. It is the intent of the claims that the term "manual means", or the like, shall also include pedal means.

The housing 14 may be mounted in any usual way on the flywheel housing of an internal combustion motor, and for this purpose a suitable mounting plate 100 is provided, bolted to the housing as indicated at 101, the base portion only being shown, the remainder being constructed in any conventional form to adapt it to a particular motor.

It will be understood that while the gear cases and gear sets in this particular instance have been shown as duplicates, they may be variously proportioned relatively. One set need not have the gears different in size while the other may have large and small gears. They may also be inverted from the order here shown, as will be understood, to adapt the device to particular uses.

The power may be applied through the bottom shaft if desired, or the transmission inverted from the position shown. Power may be taken from the driven shaft at both ends, which would make the device particularly desirable in a four-wheel-drive, or as a transmission for airplanes with tractor and propeller, blades at front and rear respectively.

The valves 41 on the pipes 36', 38' and 39' should be pressure relief valves of very high pressure retaining capacity, so that they serve as safety devices to avoid dangerously high or "overload" hydrostatic pressures. They are normally closed to retain the working pressures.

Before the valve 50 reaches the positive "low" ratio position when being moved from "neutral" position, it is possible of course to obtain the effect of lower ratio transmission by moderation of the oil flow from the gears 27'—28' through port 39. To this extent the "low" position referred to herein does not represent the lowest possible ratio of transmission, but simply the lowest positive gear transmission ratio.

In starting, it is possible to modulate the application of power by a lower ratio of transmission than the positive low gear transmission, by not fully releasing the foot pedal after shifting the lever 85, but keeping the pedal depressed sufficiently to allow the port from pipe 39 to remain open partially, and very gradually releasing the pedal, so that a very gradual starting action is attained before the full release of the pedal has moved the valve to full "low" position with port 39a closed.

It will be appreciated that by reason of the lost motion of the pin 71 in the slot 71' and the resultant delayed action of the valve, there will be a condition where in case of frequent slight fluctuations of the load the delay in response of the valve will result in its remaining at a mean position while the movements of the piston simply move the pin 71 in the slot 71'. This obviates liability of frequent and abrupt reversals of movement of the valve or jerky movements of a vehicle, as well as reducing wear of the transmission and the control means, in many ways that will be understood by those versed in the automotive and other trades where my invention is applicable.

It will also be appreciated that liability of damage to transmission gears by accidental movement of the control lever 85 is eliminated since it requires that the pedal be depressed before it can be moved, ordinarily, and also because when moved, there is no abrupt shock sustained by the transmission, due to the graduation functioning of the valve control and actuation means.

There is a further element of safety from damage to transmission parts, such as the differential in the rear axle, the axles, drive shaft, etc., by the functioning of the automatic relief valves 41.

I claim:

1. A transmission comprising a plurality of speed-changing gear trains of different ratio, a driving member, means to differentially connect it to one end of each train, a driven member, means to differentially connect the driven member to the opposite ends of the trains, said trains each including a large and a small gear but in reverse order, and means to selectively or coordinately brake either and both trains.

2. The structure of claim 1 in which the trains are separately cased to form pumps, and said braking means comprises a liquid supply, duct means from the supply to both sides of the pumps and means to selectively and coordinately control the discharges therefrom.

3. The structure of claim 1 in which the braking means includes braking connections with both trains, and means to operate both braking connections simultaneously.

4. A transmission comprising a plurality of speed changing gear trains, a driving member, a differential operative connection between the driving and one end of each train, a driven member, a differential operative connection between the driven member and the opposite ends of the trains, said trains being closely encased and the case ported to form respective pumps, means to control the discharges from the pumps coordinately and variably, and means to direct the discharge from one to the intake of the other.

5. A transmission comprising a drive member and a driven member two gear trains of different ratios, respective oppositely operable variable speed means connecting the trains and connecting the trains between the drive and driven members, and a load responsive means to control certain elements of the trains so as to vary relatively the effective motion transmitted through the respective trains and having a neutral position.

6. A transmission as in claim 5, in which the load responsive means consists of an encasement of at least two gears in each of said trains whereby they will function as respective pumps, a liquid supply connected to the pumps, discharge port connections from the pumps and means to variably restrict the discharges therefrom included in said means connecting the trains and connecting the trains between the drive and driven members, said control means including a movable member also included in said means to restrict the discharges, a pressure responsive device operatively connected with said port connections in advance of said means to restrict the discharges, and operative connections between the pressure responsive device and said movable member, all constructed and arranged so that obstruction of said discharges will be proportional to the torque transmitted, to free the low gear and retard the high gear in response to higher pressures.

7. A transmission comprising drive and driven shafts, a plurality of separate forward drive gear trains of different ratios, variable speed means connected to the trains and between the trains and the drive and driven shafts variable simultaneously from zero to maximum transmission effect of either and both trains including a differential gear, and means responsive to each of the respective loads on the trains to control the variable speed means to vary the action of the respective trains.

8. A transmission comprising a drive shaft and a driven shaft, a plurality of connected forward drive trains of different ratios, the connection therebetween including differential gearing connected to the drive and driven shafts, means to control certain elements of the trains constructed to simultaneously and oppositely vary the effective motion transmitted by the trains from the drive shaft to the driven shaft, variably from zero to maximum of relative speeds of either and both transmissions, means responsive to each of the respective loads on the trains to operate said control means consisting of a respective ported encasement of each of at least two trains to function as separate pumps, a liquid supply for the pumps, a liquid discharge port on each pump, respective cylinders, ducts from the cylinders having open connection with respective discharge ports, said ducts having also separate discharge ports, pistons in the cylinders, valve means to restrict the discharges from said ducts, pressure opposing means to increasingly oppose movement of the pistons by liquid in the cylinders, operative connections between the valve means and said pistons to operate the valve means to vary the restriction of the discharges from said ducts in proportion to the pressure effective in the cylinders.

9. The structure of claim 8 wherein the valve means is constructed with ports to restrict one pump discharge more and the other less simultaneously by movement in response to high pressures and whereby said opposing means will reverse the movement of the valve means in response to lowered pressures.

10. The structure of claim 20 in which the means to control the discharges includes a pressure responsive device in communication with the discharge ducts of the pumps including means opposing pressures communicated from the pumps progressively with increase of communicated pressures, a valve for the discharge ducts, and operative connections between the valve and pressure responsive device.

11. The structure of claim 5 including also means operable at will to positively operate the means to control the trains and including an operating member having a range of movement to move the control to neutral position from either extreme, and including a reverse drive connection means operatively associated with said control.

12. The structure of claim 7, including means operable at will to operate the control means and to interconnect the trains hydraulically in a relation to reverse the driven member.

13. The structure of claim 8 wherein the valve means is constructed with ports to restrict the discharge of one pump more, and the discharge of the other pump less simultaneously by movement in response to high pressures and whereby said opposing means will reverse the movement of the valve means in response to lowered pressure, and separate means operable at will to positively move the valve means to a neutral position.

14. The structure of claim 8 wherein the valve means is constructed with ports to restrict the discharge of one pump more, and the discharge of the other pump less simultaneously, by movement in response to high pressures and whereby said opposing means will reverse the movement of the valve means in response to lowered pressures, said valve means having also passages and ports whereby at one position the discharge from one pump will be directed to the intake of the other and thereby reverse the driven member, and means operable at will to positively move the valve means to a neutral position, and to move the valve means to reverse position independently of the load-responsive means.

15. In a transmission of the character described, the combination of drive and driven members, a plurality of parallel gear trains of different ratios of power transmission, a differential connection between the ends of said trains in one direction, and said drive member, a differential connection between the opposite ends of the trains and said driven member, an enclosure for each train to form respective pumps each having an intake and a discharge, respective cylinders connected with the discharges of the pumps, respective pistons in the cylinders, spring means operatively connected to the pistons in opposition to pressures in the cylinders, a control means for the transmission including means to restrict the discharges of the pumps beyond the cylinders, and operative connections between the pistons and the control means.

16. The structure of claim 15 including means operable at will to place the trains in neutral relation to the driven member, and to place the trains in reverse driving relation to the driven member alternatively.

17. A control for transmissions of the character described comprising a valve having a case adapted to be connected to the inlets and outlets of a plurality of pumps, separate cylinders in the valve for respective pumps and connected to pump outlet passages, pistons therein, a common member for said pistons, a seat spring, a seat member supported thereby, a lighter main spring engaged on the seat and against said common member of the pistons, means operable at will to operate the first named seat member, and transmission control connections operatively associated with the pistons.

18. A transmission comprising a plurality of speed changing gear trains of different ratios, a driving member, a differential operative connection between the driving member and one end of each train, a driven member, a differential operative connection between the driven member and the opposite ends of the trains, a ported case for each train to form respective pumps, and means to control the discharges from the pumps coordinately and variably.

19. The structure of claim 7 in which a lost motion operative connection is included between the load responsive means and said variable speed means connected to the trains.

20. A transmission comprising a housing and liquid reservoir, two individually cased transmission gear units at opposite sides thereof, each including identical large and small principal gears meshed together the two units being in reversed mutual relation with the said large and small gears of one unit on the axes respectively of the said small and large gears of the other unit, a main shaft on each said axis, a differential gear connection between each shaft and the gears of each unit on the same axis, said shafts being constructed for operation as driving and driven members respectively, the case of each unit having discharge and intake ducts whereby the gears and cases form pumps, a liquid supply in communication therewith, and means to control the discharges from the pumps simultaneously with opposite effects for the purposes described.

21. The structure of claim 20 in which the said units are spaced apart, said ducts being open in a common direction at one end, and said means to control the discharges from the pumps comprising a multi-way valve including a casing having duct tits adapted to engage and fit simultaneously by compression the ends of the said ducts, and means to secure the case in operative position.

22. The structure of claim 20 in which said ducts open in a common direction at one end, and said means to control the discharges from the pumps comprises a multiway valve having a casing with duct tits to simultaneously engage by compression the ends of the ducts, the valve including a valve body coactive with the casing and ducts therein to restrict the discharge from one pump while relieving that from the other at part of the movement of the valve body, and to vent the discharge from both pumps freely at another position, and means to operate said valve body.

23. The structure of claim 7, said variable speed means connected to the trains and between the drive and driven shafts including an encasement for respective gear trains to form respective pumps, one of said pumps including a train requiring a relatively low pressure to be opposed thereto to brake it, and another of said pumps including a train requiring a relatively high pressure to be opposed to brake it, said means responsive to the loads including a large cylinder in communication with the discharge of the said one pump, and a small cylinder in communication with the discharge of the said other pump, respective pistons in said cylinders, resilient means engaged with the pistons in opposition to pressures in the cylinders, a common valve to control the discharges beyond said cylinders, operative connections between the pistons and the valve, and a liquid supply for the pumps.

24. A transmission comprising two individual transmission gear train units, each of a different ratio of power transmission, a driving member, a differential gear connection between the driving member and the trains at one end of each, a driven member, a differential gear connection between the driven member and the other ends of the trains, said trains and differential gears being constructed to idle under rotation of the driving member when the driven member is stopped and the two trains free otherwise, control means to regulate the relative speeds of the trains comprising a movable member having a neutral position at which the two trains are free and having movement over another part of its path in which the trains are oppositely regulated whereby motion of one is reduced progressively and the motion of the other accelerated progressively, and an automatic operating means for the control comprising a load-responsive device including a force transmitting means operatively associated with the trains and connected to the load responsive device and operative connections therefrom to the control means, means to stop movement of the automatic means short of said neutral position of the control means, and manual control means to move the control to and from neutral position at will.

25. The structure of claim 24 in which the said automatic operating means includes a resilient yielding member whereby the control may be moved to neutral position at times during operation of the transmission.

26. A transmission consisting of two individual transmission gear trains, each of a different ratio of motion transmission, a drive member, a differential gear connection between the driving member and one end of each train, a driven member, a differential gear connection between the driven member and the other ends of the trains, said trains and differential gears being constructed to idle under rotation of the driving member when the driven member is stopped and the two trains free otherwise, control means to regulate the relative speeds of the trains comprising a movable member having a neutral position at which the two trains are free and being movable in a path and being constructed and arranged so that the trains are oppositely regulated simultaneously, whereby motion of one is reduced progressively and motion of the other accelerated progressively in response to movement of the movable member in said path.

27. The structure of claim 26 in which said load responsive device includes means responsive individually to the load on each train, and to differentiate the forces transmitted in response thereto, and a common connection whereby the sum of the forces of response is transmitted to the control means first named.

28. In a mechanical power transmission device, a prime mover element, a driven element, a transmission system operatively associated therewith constructed and arranged to transmit motion from the one to the other for forward and reverse motion of the driven element and in a variable ratio in at least one direction and being constructed and arranged to operate in idling relation to the first named two elements, control means to vary the effective operative ratio relation of the transmission to the first named two elements, including a movable ratio-change member having a neutral position when the transmission is in said idling relation and having also forward positions in a given zone of its movement and a reverse position at another part of its movement and being manually movable; said control means including a pump operatively associated with the transmission, a fluid supply therefor, said control means further including means to control the discharge of fluid from the pump; means responsive to pressures of fluid compressed by said pump to operate said movable ratio-change member; said transmission system, pump, means to control discharge of fluid, movable ratio-change member and pressure responsive means being constructed, arranged, and connected to be automatically cooperative when said movable ratio-change member is in said zone of its movement.

29. The structure of claim 28 in which said transmission has ratios individual to respective positions of said movable ratio change member in said zone, and said pump and said means responsive to fluid pressure are constructed and arranged to position said movable ratio change member in said zone corresponding with the torque resistance of said driven member.

30. The structure of claim 28 including a manually operable movable member operatively connected with said movable ratio change member to position the latter in said neutral position and to move it into said zone and therefrom at will, and to move the movable ratio change member into said reverse position at times.

BINGHAM BURNER.